United States Patent [19]

Walley, Jr.

[11] 4,075,502
[45] Feb. 21, 1978

[54] MONITORING DEVICE

[75] Inventor: Everette D. Walley, Jr., North Chili, N.Y.

[73] Assignee: General Signal Corporation, Rochester, N.Y.

[21] Appl. No.: 745,268

[22] Filed: Nov. 26, 1976

[51] Int. Cl.² .......................................... H02H 11/00
[52] U.S. Cl. .................................................. 307/64
[58] Field of Search ...................... 307/64, 65, 66, 85, 307/86, 87, 92, 94

[56] References Cited
U.S. PATENT DOCUMENTS 3,428,820  2/1969  Lyon ....................................... 307/64
3,811,050  5/1974  Michelet et al. ........................ 307/64

Primary Examiner—Herman Hohauser
Attorney, Agent, or Firm—Milton E. Kleinman; John Ohlandt

[57] ABSTRACT

A monitoring device which is directed to achieving a more reliable power supply for an electronic or electromechanical system; such monitoring device including a means for selecting, in response to detection of subtle failures in either of two power supplies, so as to connect one and only one of the power supplies, regardless of internal failure within the monitoring device itself.

4 Claims, 5 Drawing Figures

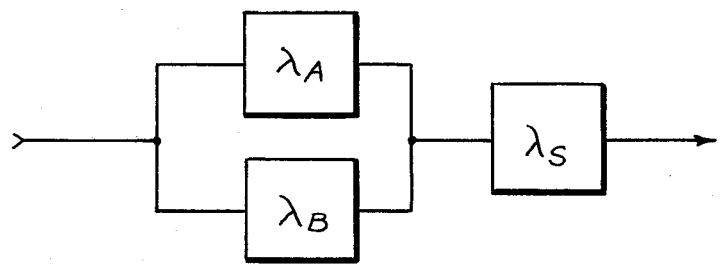
*FIG. 1*
*PRIOR ART*
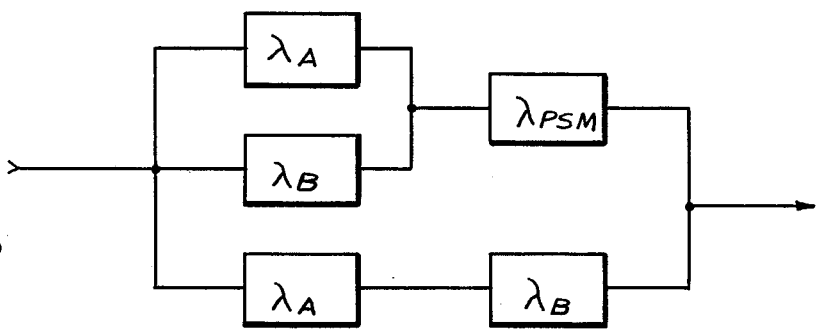
*FIG. 2*
*FIG. 3*
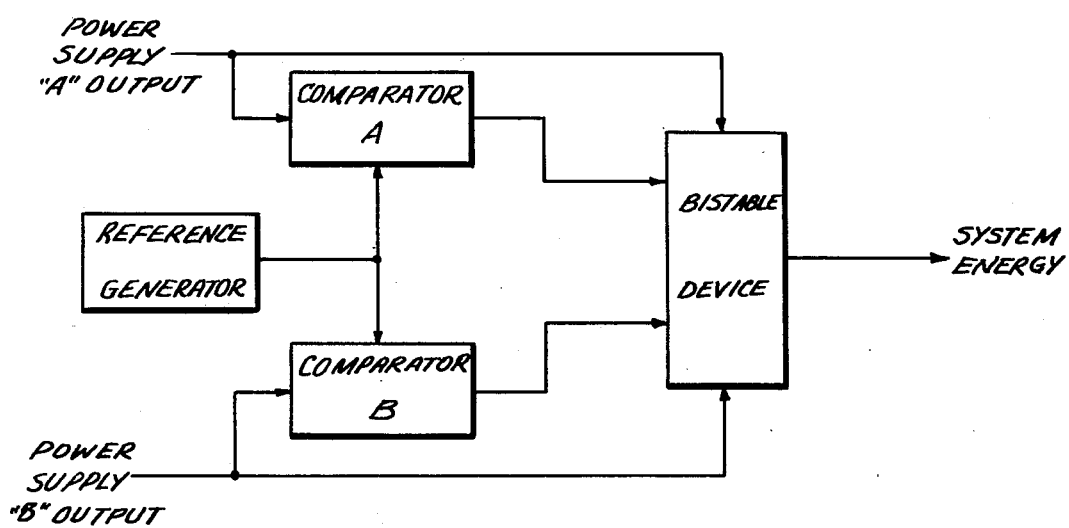

MONITORING DEVICE

BACKGROUND, OBJECTS AND SUMMARY OF THE INVENTION

The present invention pertains to a monitoring device and particularly to such a device which will significantly improve on the reliability afforded in an electronic or electromechanical system, especially with respect to a power supply for such a system.

Many attempts have been made in the past to implement the achievement of reliability in the functioning of electrical components and particularly so where such components are concerned with providing reliable power supplies to an electronic system. The desired reliability is especially difficult to achieve in the situation where the failures that may be encountered differ substantially in nature and where failures in one of the units will affect the functioning of the other unit serving as a redundant or backup means.

Although the principle of the present invention will be disclosed in a detailed embodiment featuring the application to a power supply, it will be evident that the principle is perfectly general and can be applied to a variety of electrical components whose operation must be extremely reliable and therefore ordinarily calling for a conventional redundancy scheme.

In connection with the need to furnish a reliable power supply unit, it will be recognized that a variety of failure modes can exist and these are: loss of regulation which may take several forms; that is, the output of the supply may be too high in voltage, thus failing to meet established criteria, or the output of the supply may be too low in voltage and similarly fail. Another problem which may be presented is that the AC content may not be satisfactory; that is to say, either ripple or transient noise energy levels may become too high. Yet another possible failure is that no output voltage will be realized from a power supply unit, either for the reason that the output of the supply has become shorted, often with the consequence that the other or redundant power supply has its voltage pulled down; or, it may turn out that the output of a power supply has become open.

Accordingly, it is a primary object of the present invention to detect any one of the aforesaid failure modes in a given power supply and to connect an auxiliary power supply in its place.

However, based on the above described failure modes it is clear that if redundant power supplies are needed in order to meet a specific reliability goal, a selection device with good isolation between the supplies is necessary in order to preclude a failure in one supply causing a secondary failure in the other supply. In addition to this, and most importantly, the selection device must be capable of detecting even the aforenoted subtle failures in either of the supplies, that is to say, the aforenoted loss of regulation or the AC content being not within the specified limits.

Accordingly, it is a further primary object of the present invention to provide a selection device with the requisite isolation as aforenoted, but to achieve greater reliability than is simply attainable by a conventional redundancy scheme or system.

In accordance with the stated primary objects, the present invention provides a selection device so arranged that, for example in the particular case of power supplies, the selection device (or power supply monitor) must choose one and only one of the power supplies to supply energy to the system regardless of internal failure within the selection device itself. As will be made especially clear hereinafter, a much improved total reliability results because there is an additional possibility for success in furnishing power to the system.

Other and further objects, advantages and features of the present invention will be understood by reference to the following specification in conjunction with the annexed drawing, wherein like parts have been given like numbers.

BRIEF DESCRIPTION OF THE DRAWING

FIG. 1 is a block diagram illustrating the reliability aspects in accordance with the prior art;

FIG. 2 is a reliability block diagram in consequence of the arrangement of the selection device or power supply monitor in accordance with the present invention;

FIG. 3 is an electrical block diagram for impelementing the device of the present invention;

DESCRIPTION OF PREFERRED EMBODIMENT

Referring now to FIG. 1, there is illustrated a reliability block diagram in accordance with conventional or prior art practices in which a pair of power supplies is connected in a redundancy scheme or arrangement to furnish power to a given piece of equipment. Within the blocks are symbols having the following meaning:

$\lambda$ A is the failure rate of any equipment unique to the A power supply;

$\lambda$ B is the failure rate of any equipment unique to the B power supply;

$\lambda$ S is the failure rate of all the equipment in the selection device which is common to both power supplies.

What is unfortunately the case with the above described prior art arrangement is that since the function of the selection device is quite complex, the failure rate for this device will be relatively high. Consequently, even though the failure rate of each of the individual power supplies may be relatively low, the over-all rate will be relatively high for the entire scheme or system.

As previously indicated, the device of the present invention which is a selection device, and in the particular case in which consideration is given to the monitoring of power supplies, is termed a power supply monitor, an unusual design restriction is placed on the hardware. This restriction is that the power supply monitor must choose one and only one of the power supplies to supply energy to the system. The resulting reliability block diagram is illustrated in FIG. 2. As indicated in that diagram there is now an additional success path for the over-all functioning, this additional success path resulting from imposing the aforenoted restriction.

In achieving the reliability afforded by the system shown in FIG. 2 the selection device or monitor is functionally constituted of a number of comparators each of which is capable of sampling the outputs of the several power supplies and comparing these outputs to a reference or references. These comparators can be multiplied depending upon the criteria established, but basically the output of the comparators is designed, firstly, to indicate that there has been a loss of regulation whereby the output of a given supply is either too high or too low in voltage or is even shorted out or open; moreover one of, the comparators for each power supply samples the AC content and determines whether or not it is out of tolerance. The output stage of the power supply monitor is a bistable device that must have only two distinct outputs regardless of its own internal failures. In accordance with the functional diagram as shown in FIG. 3, the arrangement is such that comparator A compares the A supply output with some reference from a reference generator as indicated, and the comparator B compares the B output with the same reference. If for example power supply A fails in the comparison, the output of comparator A will signal the bistable component to select the B power supply for providing energy to the system.

Figure 4:
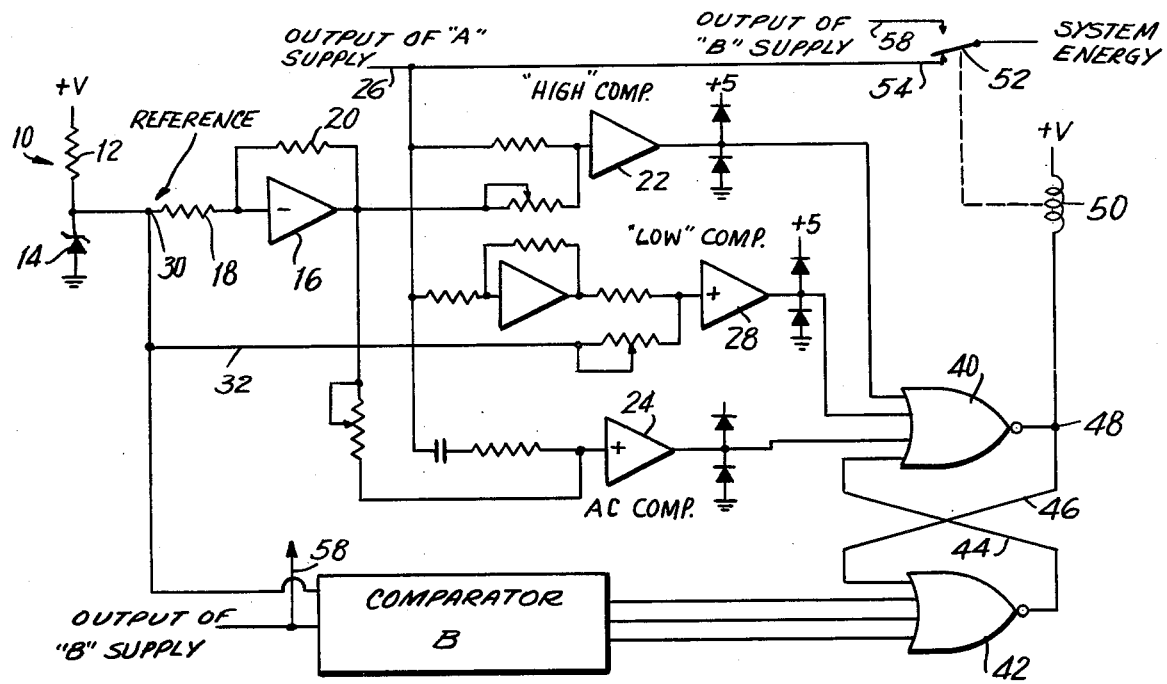
FIG. 4 is a schematic diagram illustrating in greater detail the elements forming the device of FIG. 3.

The detailed hardware implementation of the selection device or power supply monitor seen in FIG. 3 may be appreciated by reference to the schematic diagram of FIG. 4. In this diagram there will be seen a fixed reference voltage device 10 comprising a source +V, resistor 12, and Zener diode 14. A connection is made, from the cathode of the Zener diode providing the regulated reference voltage to the input of the operational amplifier 16, by a well-known input and feedback connection involving resistors 18 and 20 to a minus or negative input terminal of such amplifier. Appropriate connections are made from the output of operational amplifier 16 to the operational amplifier 22, which functions as a "high" comparator, and to the operational amplifier 24 functioning as a comparator to check on AC content.

The output of the A power supply is connected by way of line 26 to the same plus input of the aforesaid amplifiers 22 and 24. An additional connection of the A power supply is made to another operational amplifier 28 which functions as a "low" comparator. The reference voltage is connected from the point 30 by way of line 32 to the plus input of amplifier 28.

It will be noted that a diode pair is connected to each of the outputs of the amplifiers 22, 24 and 28, the connection being to a plus 5 volt supply, the midpoint between diodes being connected to the individual input of one of the elements 40 of a bistable device. This device comprises a conventional or typical flip-flop arrangement, the other element of the bistable device being element 42. The two elements 40 and 42 are cross-coupled by lines 44 and 46 in a conventional manner. The output 48 of the element 40 is connected to a relay 50 which is further connected to a voltage supply +V.

The relay 50 controls the operation of its movable contact 52 which is operable to connect either the output of the A power supply by way of line 54 to the system energy on line 56 or to connect the output of the B supply by way of line 58 to the other fixed contact. It will be noted that the line 58 extends from the lower portion of FIG. 4 as indicated by the arrow.

It will likewise be appreciated that the box designated comparator B contains the same circuitry as already described, that is, an identical circuit involving a companion group or series of comparators. Likewise, the same connections as previously noted, that is, the same connections to element 42 are made from the comparator B as were made from comparator A to element 40.

In operation of the selection device of the present invention, the power supply A is normally the preferred power supply, that is, the non-energized state of relay 50 is such that the contact 52 is made with line 54 coming from the power supply A. Then, only if some failure in accordance with the established criteria occurs, does the individual output from one of the amplifiers 22, 24 or 28 cause the element 40 of the bistable device to be changed in state such as to change the relay 50 to the energized state, whereby the movable contact 52 is transferred to make contact with the fixed contact connected to line 58, which in turn is connected to the power supply B.

On the other hand assuming that power supply A is functioning, a failure in the power supply B, which is the auxiliary supply, produces no change in the state of the relay coil 50 and, as is desired, the power supply A remains connected to the system. Thus, the system remains operative. Moreover, if only the selection device, i.e., the power supply monitor, fails, the system is still operative because the output of the monitor is restricted to choosing one and only one of the two fully operational power supplies, either A or B.

It should be noted that the relay coil 50 is part of a relay which is constructed such that both the normally open and normally closed contacts cannot be closed simultaneously. Such a relay is also one such that the probability of failure with neither set of contacts closed is extremely small. A relay which satisfies these requirements is what is known as a General Railway Signal type J relay. Such relay is described in GRS Catalog 69-1, entitled "THE J LINE OF PLUG-IN RELAYS" (1973).

Figure 5:
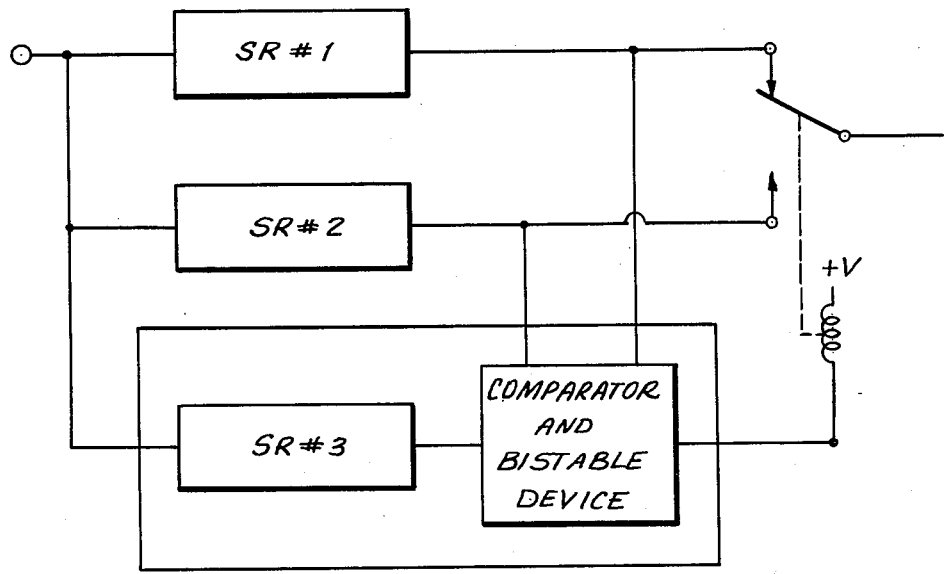
FIG. 5 is a block diagram illustrating a system of more general application, involving a variety of desired operating components where redundancy is afforded and, in addition, a selection device in accordance with the present invention is furnished.

Although in a preferred embodiment the selection device has been considered as functioning for the purpose of power supply monitoring, it will be understood by those skilled in the art that the general principle of the invention is applicable to other systems. For example, a perfectly general arrangement can be provided as illustrated in FIG. 5. Therein a pair of individual components, for example speed regulators SR1 and SR2, are found, the first or SR1 being the main component and the auxiliary component being SR2. Yet another component similar to the above, that is, SR3, is used as a reference device. Thus, the states or conditions, in accordance with established criteria for the SR1 and SR2 devices, are fed to the comparator and bistable device 60. At the same time a connection is made from the reference device SR3. In similar manner to the arrangement of FIG. 4, the operations of SR1 and SR2 are continuously compared with that of the reference device SR3; and, for example, should the state or condition of SR1 deviate significantly from SR3, the same relay as before, that is the relay 50, becomes energized to change the contacts, thereby to connect SR2 to the output line 62.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A system for selecting one of a plurality of available electrical components in the event that another of the components is subject to failure in accordance with a plurality of functional criteria, comprising:
   an input and an output;
   selection means for selecting one of the components to be connected between said input and said output, including means for insuring that said selection means operates to select one and only one of said components, whereby failure of the selection means itself still results in one of the components being connected;

a reference device for supplying an independent positive reference voltage;

said selection means including a group of comparators for each component for comparing on a plurality of bases between each of said components and said reference device, each of said components and said reference device being connected to inputs of said respective groups of comparators;

a bistable device having its inputs connected to the outputs of all of the individual comparators in said groups of comparators and its output connected to said reference voltage; and a relay connected to the output of said bistable device for connecting only one or the other of said components to said output.

2. A system as defined in claim 1, in which said components are two power supplies arranged for connection between said input and output, and said selection means is a power supply monitor comprising a plurality of comparators for comparing between the voltage levels and AC content of each of said power supplies and a reference generator.

3. A system as defined in claim 2, in which each of said comparators comprises an operational amplifier having inputs connected to one of said power supplies and to said reference device.

4. A system as defined in claim 3, in which the outputs of said operational amplifier are connected to said bistable device.

* * * * *